US007390260B2

(12) United States Patent
Englman

(10) Patent No.: US 7,390,260 B2
(45) Date of Patent: Jun. 24, 2008

(54) WAGERING GAME HAVING A BLIND SELECTION FEATURE

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 634 days.

(21) Appl. No.: 10/838,633

(22) Filed: May 3, 2004

(65) Prior Publication Data

US 2005/0245309 A1 Nov. 3, 2005

(51) Int. Cl.
*A63F 9/24* (2006.01)
*A63F 13/00* (2006.01)
*G06F 19/00* (2006.01)
*G06F 17/00* (2006.01)

(52) U.S. Cl. .............................. 463/20; 463/12; 463/13; 463/25; 463/40; 273/143 R; 273/236; 273/269; 273/292; 700/91; 700/93

(58) Field of Classification Search ............. 463/12-13, 463/16-20 I, 25-27, 40-43; 273/143 R, 273/292-293, 236-237, 269; 700/91-93
See application file for complete search history.

(56) References Cited

U.S. PATENT DOCUMENTS 6,015,346 A 1/2000 Bennett ........................ 463/20
6,089,976 A 7/2000 Schneider et al. ............. 463/16
6,190,255 B1 * 2/2001 Thomas et al. ................ 463/20
6,309,300 B1 10/2001 Glavich ........................ 463/26
6,347,996 B1 2/2002 Gilmore et al. ............... 463/20
6,443,452 B1 9/2002 Brune ..................... 273/143 R
6,471,208 B2 10/2002 Yoseloff et al. ......... 273/143 R
6,511,375 B1 * 1/2003 Kaminkow .................. 463/20
6,514,141 B1 * 2/2003 Kaminkow et al. ........... 463/25
6,533,273 B2 3/2003 Cole et al. ............... 273/138.1
6,561,904 B2 5/2003 Locke et al. .................. 463/25
6,575,830 B2 * 6/2003 Baerlocher et al. ............ 463/20
6,602,137 B2 8/2003 Kaminkow et al. ........... 463/16
6,634,943 B1 10/2003 Baerlocher et al. ............ 463/25
6,648,758 B2 11/2003 Bennett et al. ................ 463/20
6,659,864 B2 * 12/2003 McGahn et al. ............... 463/16
6,663,489 B2 12/2003 Baerlocher et al. ............ 463/20
6,726,563 B1 4/2004 Baerlocher et al. ............ 463/25
6,729,618 B1 * 5/2004 Koenig et al. ............ 273/138.2
6,739,971 B2 5/2004 Devaull ....................... 463/20

(Continued)

OTHER PUBLICATIONS

"Spot The Dog" Brochure, by Olympic Video Gaming, two pages, undated.

*Primary Examiner*—John M. Hotaling, II
*Assistant Examiner*—Paul A. D'Agostino
(74) *Attorney, Agent, or Firm*—Nixon Peabody LLP

(57) ABSTRACT

A gaming terminal for playing a wagering game includes a basic game and a bonus game. The basic game has a plurality of symbols that indicate a randomly selected outcome from a plurality of outcomes in response to a wager input by a player. The bonus game is triggered by a predetermined event such as by selecting a start-bonus outcome from the plurality of outcomes. The bonus game includes a plurality of free spins and a plurality of blind selections, at least one of the blind selections being selected before playing each of the free spins. The selected blind selection reveals a bonus enhancement that is provided to the player after the bonus enhancement has been revealed.

30 Claims, 5 Drawing Sheets

U.S. PATENT DOCUMENTS

| | | | | |
|---|---|---|---|---|
| 6,796,900 | B2 | 9/2004 | Baerlocher | 463/16 |
| 6,796,905 | B2 * | 9/2004 | Baerlocher et al. | 463/25 |
| 6,811,483 | B1 * | 11/2004 | Webb et al. | 463/16 |
| 6,890,257 | B2 * | 5/2005 | Baerlocher | 463/25 |
| 2001/0046893 | A1 * | 11/2001 | Giobbi et al. | 463/24 |
| 2002/0025846 | A1 | 2/2002 | Bennett et al. | 463/20 |
| 2003/0054872 | A1 | 3/2003 | Locke et al. | 462/20 |
| 2003/0069056 | A1 | 4/2003 | Cormack et al. | 463/16 |
| 2003/0162583 | A1 * | 8/2003 | Baerlocher et al. | 463/20 |
| 2003/0162585 | A1 | 8/2003 | Bigelow, Jr. et al. | 463/20 |
| 2003/0211879 | A1 | 11/2003 | Englman | 463/20 |
| 2004/0018873 | A1 * | 1/2004 | Hughs-Baird et al. | 463/20 |
| 2004/0023707 | A1 * | 2/2004 | Maya et al. | 463/16 |
| 2004/0038731 | A1 * | 2/2004 | Englman | 463/25 |
| 2004/0053672 | A1 | 3/2004 | Baerlocher | 463/20 |
| 2004/0063493 | A1 * | 4/2004 | Baerlocher | 463/25 |
| 2004/0219967 | A1 * | 11/2004 | Giobbi et al. | 463/16 |
| 2005/0245309 | A1 | 11/2005 | Englman | 463/20 |

* cited by examiner

WAGERING GAME HAVING A BLIND SELECTION FEATURE

FIELD OF THE INVENTION

The present invention relates to gaming terminals and gaming systems and, in particular, to a bonus game having a blind selection feature that reveals a bonus enhancement for each one of a plurality of free spins.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Some existing bonus games award the player a plurality of free games, more generally referred to as free spins. The free spins are generally provided with a specific bonus enhancement that is applied to all the free spins played that are awarded during a particular bonus game. One problem with this approach is that the bonus enhancement has already been determined before the first free spin is played, and, consequently, there is no surprise as to what the bonus enhancement will be for each additional free spin. Thus, the level of excitement is reduced after the bonus enhancement has been selected, regardless of whether the number of free spins is two or fifty. Because the bonus enhancement has already been determined for all the free spins, the player will most likely lose interest in some or most of the remaining free spins.

In some bonus games, the specific bonus enhancement is a blind selection, wherein the bonus enhancement is revealed only after the player makes the selection. Although a blind selection might be more exciting than a known selection, these bonus game suffer from the same problem as discussed above. The level of excitement lasts only until the blind selection is revealed. Thereafter, the player is a mere observer of the game for the remainder of the free spins, regardless of the number of free spins.

Although free spins have the potential to raise a player's level of excitement and to produce a sense of achievement even if the free spins do not provide additional winnings, the mere award of free spins may not necessarily provide enough entertainment value to maintain the player's interest. An award of free spins can be further improved by providing the player with additional choices for affecting the outcome of each one of the free spins. Providing additional interaction between the player and the bonus game such that the outcome of the free spins may be different for each free spin may increase the time a player will spend at a particular gaming machine.

Thus, the present invention is directed to satisfying the needs of players for enhanced excitement by enabling the players to affect the outcome of each one of a plurality of free spins awarded during a bonus game.

SUMMARY OF THE INVENTION

The present invention relates to a gaming terminal for playing a wagering game, which includes a basic game and a bonus game. The basic game has a plurality of symbols that indicate a randomly selected outcome from a plurality of outcomes in response to a wager input by a player. The bonus game is triggered by a predetermined event, such as by achieving a start-bonus outcome from the plurality of outcomes. The bonus game includes a plurality of free spins and a plurality of blind selections, at least one of the blind selections being selected before playing each of the free spins. The selected blind selection reveals a bonus enhancement that is provided to the player.

In another embodiment, the present invention relates to a method for playing a wagering game. The method includes showing a plurality of symbols for playing a basic game and indicating, via the symbols, a randomly selected outcome from a plurality of outcomes of the basic game. A bonus game is triggered when the randomly selected outcome is a predetermined outcome. The bonus game includes a plurality of free spins and a plurality of blind selections. At least one of the blind selections is selected before playing each one of the free spins. A bonus enhancement is revealed after selecting one of the blind selections and a next free spin is played. The bonus enhancement is applied only to the free spin following the revealing of the bonus enhancement.

In another embodiment, the present invention relates to a gaming terminal for playing a wagering game, which includes a housing having a wager-input device, at least one display for displaying a first screen and a second screen, and a processor for randomly selecting an outcome from a plurality of outcomes of said basic game in response to receiving a wager via said wager-input device. The first screen shows a basic game having a number of reels, each of the reels having at least one symbol. The second screen shows a bonus game having a plurality of blind selections and a plurality of free spins. The bonus game is triggered upon selecting a start-bonus outcome from the plurality of outcomes. At least one of the plurality of blind selections is selected before each one of the plurality of free spins is activated. At least one of the plurality of blind selections reveal, after being selected, a bonus enhancement, which is applied only to the subsequent free spin.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
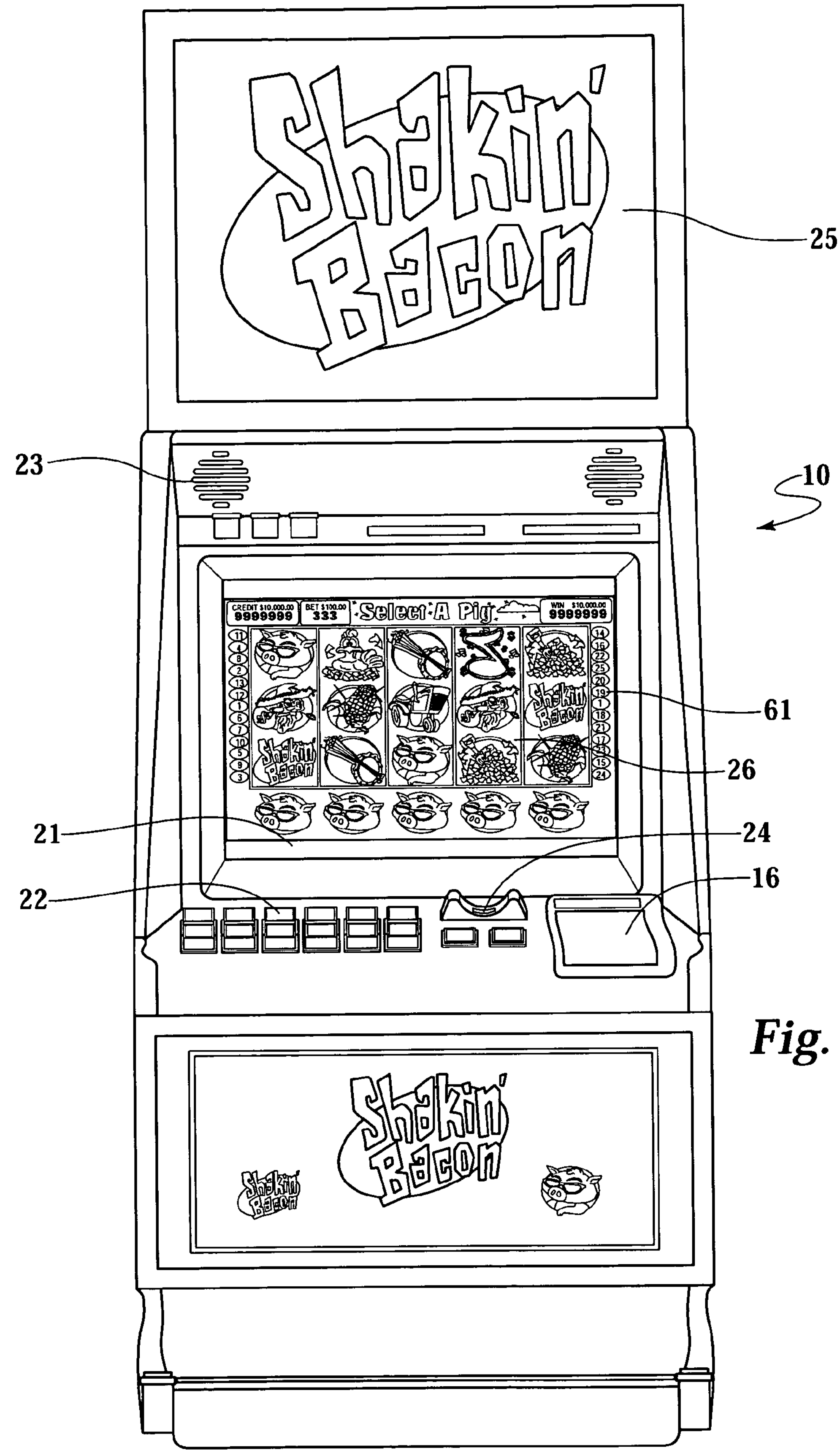
FIG. 1 illustrates a gaming terminal that is useful for operating an enhanced progressive game in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Referring to FIG. 1, a gaming terminal 10 is used in gaming establishments such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc.

The gaming terminal 10 includes input devices, such as a wager acceptor 16, a touch screen 21, a push-button panel 22, and a player-identification card reader 24. For outputs, the gaming terminal 10 includes a main display 26 for displaying information about the basic wagering game and at least one audio device 23 for playing sounds associated with any one of the basic, bonus, and progressive games. The main display 26 can also display information about a bonus wagering game and a progressive wagering game. The gaming terminal 10 also includes a secondary game display 25 for displaying a bonus wagering game or award amounts of a progressive game. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include a coin slot acceptor or a note acceptor to input value to the gaming terminal 10. Or, the wager acceptor 16 may include a card-reading device for reading a card that has a recorded monetary value with which it is associated. The card may also authorize access to a central account, which can transfer money to the gaming terminal 10.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 can also display a bonus game associated with the basic wagering game. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome.

The audio device 23 generally includes one or more speakers 23 located in the housing of the gaming terminal 10. Sounds such as spoken phrases and music are played through the speakers 23 to enhance the entertainment ambience provided by the gaming terminal 10. For example, music can be played during a bonus game such that the tempo of the music is faster or slower in response to a selection by the player.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10.

A player begins play of the basic wagering game by inserting a wager input into the wager input accepter 16 of the gaming terminal 10. A player can select play by either using the touch screen 21 or the push-button panel 22. The basic game consists of a plurality of symbols on reels 60 that are displayed along a payline 61, yielding a plurality of outcomes of the basic game. Such outcomes are randomly selected in response to the wagering input by the player. One of the plurality of randomly selected outcomes is a start-bonus outcome, which can include any variations of symbols and which triggers a bonus game.

Figure 2:
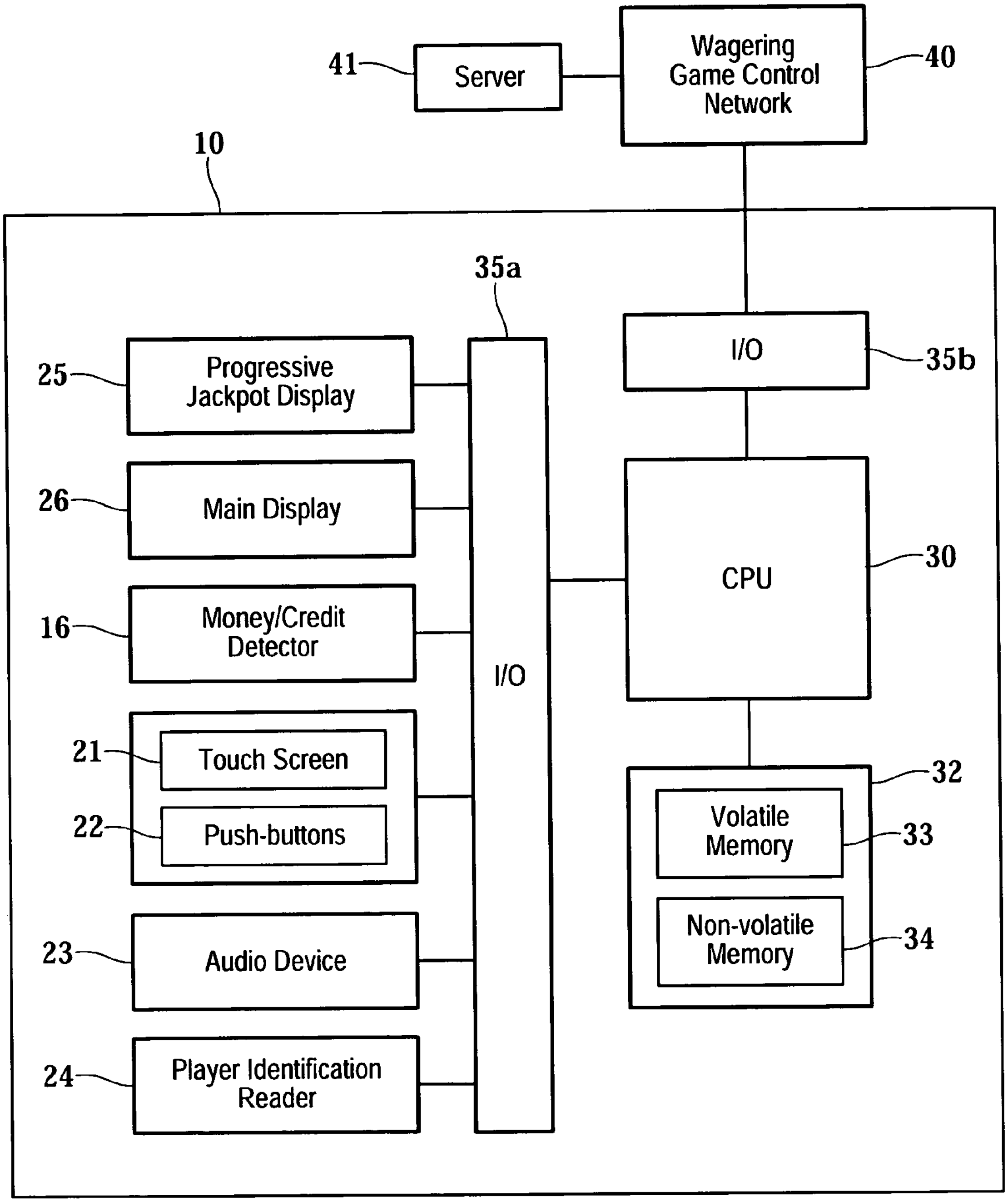
FIG. 2 illustrates a control system that is used in conjunction with the gaming terminal of FIG. 1.

As shown in FIG. 2, the various components of the gaming terminal 10 are controlled by a central processing unit (CPU) 30, also referred to as a processor (such as a microprocessor or microcontroller). To provide the gaming functions, the CPU 30 executes a game program. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices. The gaming terminal 10 often has multiple serial ports, each port dedicated to providing data to a specific host computer system that performs a specific function (e.g., accounting system, player-tracking system, progressive game control system, etc). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40, which can be communicatively coupled to a server 41.

Figure 3:
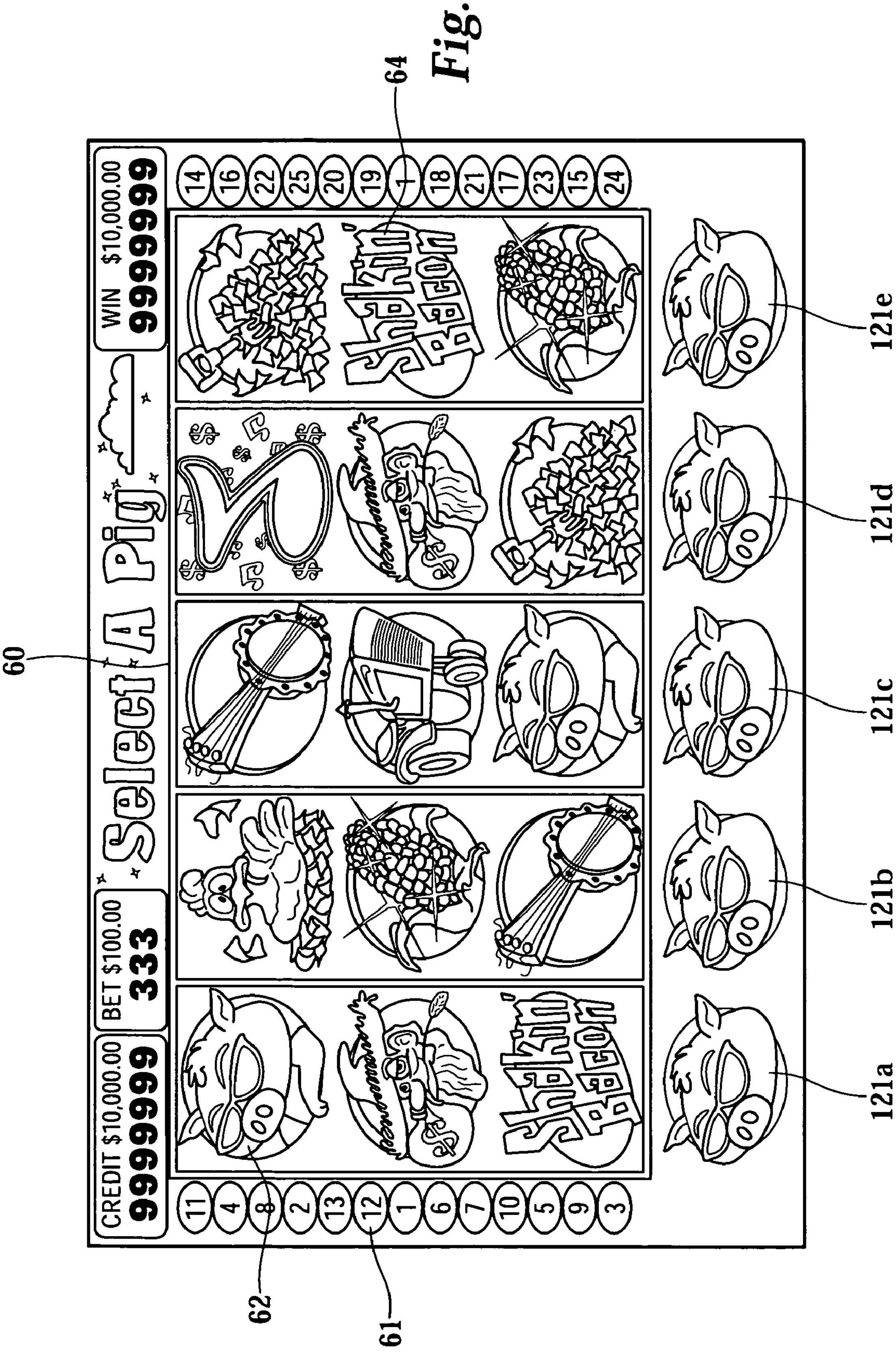
FIG. 3 illustrates a basic game screen and a plurality of blind selections for selecting before a free spin.
Figure 4:
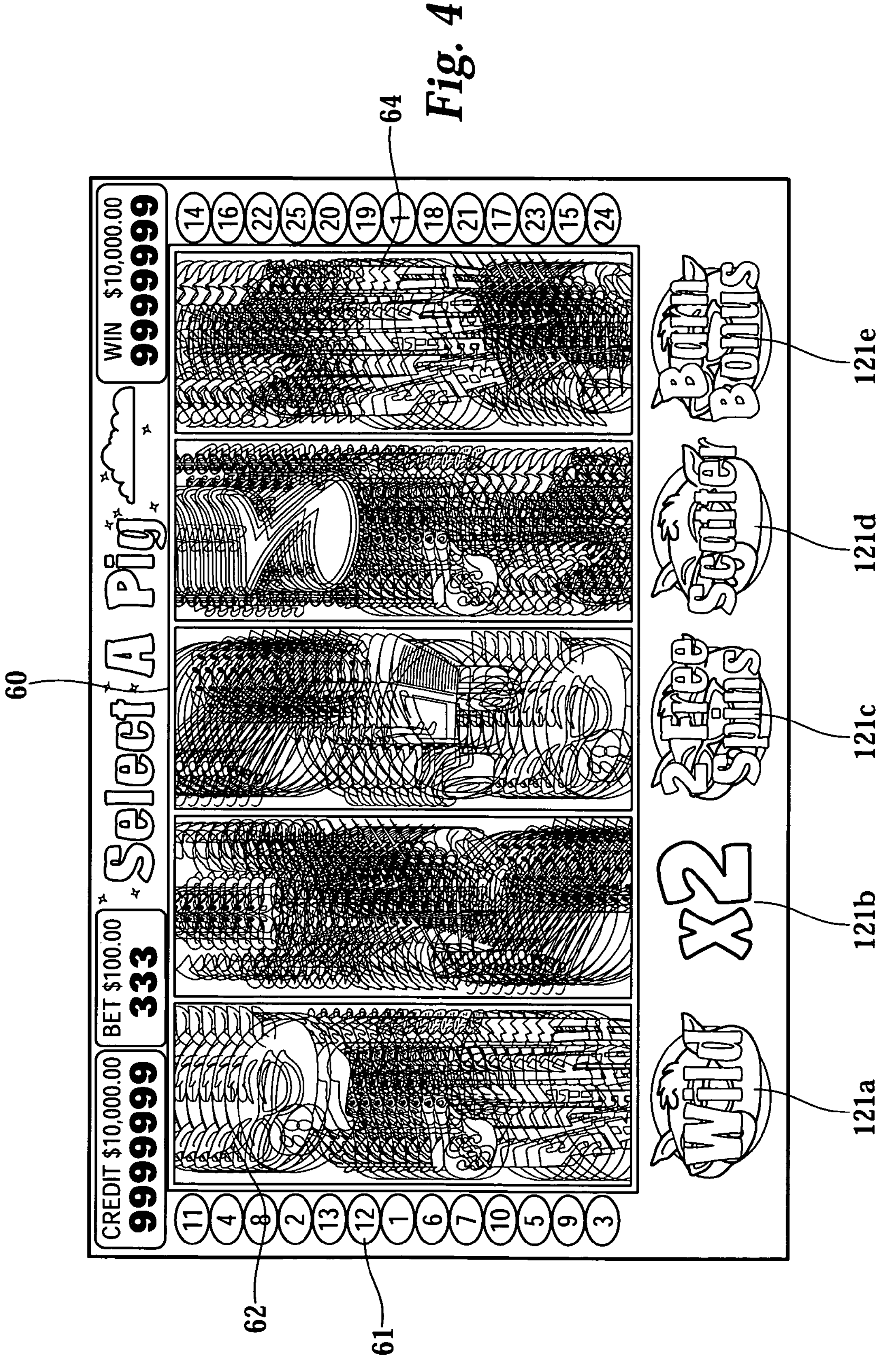
FIG. 4 illustrates a bonus game screen with spinning reels and a plurality of bonus enhancements.

Referring now to FIGS. 3 and 4, a bonus wagering game will be described in more detail. In the illustrated embodiment, the theme of the wagering game is entitled "Shakin' Bacon" and it includes symbols depicting, for example, the upper body of a pig wearing sunglasses, a farmer holding a bag of money, a banjo, etc. The start-bonus outcome can be determined, for example, by having three pig symbols 62 appear on the basic game screen. Assuming that a shakin' bacon symbol 64 is used as a wild symbol, then the symbol arrangement shown in FIG. 3 would trigger the start of the bonus game because it includes two pigs symbols 62 and two shakin' bacon symbols 64 (each being substituted for a pig symbol 62). Other themes and other symbols can be used in other embodiments.

When the bonus game is triggered, the basic game screen moves up higher on the display 26 and five blind selections 121 appear at the bottom of the basic game screen. Each of the blind, also referred to as hidden or masked, selections 121 is shown having a pig head wearing sunglasses. In other embodiments, a different number of blind selections 121 can be used and different symbols can be used to show each one of the hidden selections 121.

The bonus game awards the player a number of free spins, which can be a predetermined number or a number selected by the player. Before the start of each free spin, the player is prompted to select a pig 121 to reveal a bonus for each free spin. After selecting a pig 121 the bonus screen reveals a bonus enhancement that was initially hidden from the player's view. For example, referring to FIG. 4, a player has selected a pig 121*b*, which has revealed a "X2" multiplier. Thus, any winnings awarded for the free spin that follows the player's selection of the pig 121*b* will be doubled. Accordingly, if the winning combination for the spin would correspond to winning 100 credits, then the "X2" multiplier would in actuality give the player 200 credits. If, however, no winning combination results for the spin, the player is awarded zero credits for that particular spin.

After the player made the selection of the pig 121*b*, the reels 60 start to spin and the other bonus items are grayed out. The player can see what other bonus enhancements he or she could have chosen, such as a "Wild" bonus enhancement 121*a*, a "2 Free Spins" bonus enhancement 121*c*, a "Scatter" bonus enhancement 121*d*, and a "Barn Bonus" bonus enhancement 121*e*.

An example of a bonus game will be described below to better illustrate the use of the blind selections 121. After the bonus game has been triggered, the player is awarded five free spins. The basic game screen shifts upward and five pigs 121 are shown as the hidden selections. The player selects one of the blind selections 121, pig 121*b*, and all five hidden selections are now revealed, showing the five bonus enhancements 121*a*-121*e* that have been described above in reference to FIG. 4. The "X2" bonus enhancement 121*b* will be applied to the first free spin. After selecting the "X2" bonus enhancement 121*b* the reels 60 start to spin and, after the reels 60 stop, a winning combination results that ordinarily pays 100 credits. However, because the "X2" bonus enhancement 121*b* is in effect for this free spin, the player is awarded 200 credits (100×2). Alternatively, the unselected blind selections 121 can remain hidden until selected during following free spins.

The blind selections 121 are now reset to show the pig heads and the bonus enhancements are reshuffled such that they are not necessarily in the same order they were before the first free spin. Before the next spin (the second free spin), the player selects another one of the blind selections 121, pig 121*d*. Assuming that the bonus enhancements have been reshuffled, we will assume that pig 121*d* reveals the "2 Free Spins" bonus enhancement. If the player achieves a winning combination during the second free spin, the player will gain two free spins, based on the "2 Free Spins" bonus enhancement. Thus, the player may have won a total of seven free spins. The two free spins may be awarded without requiring the player to achieve a winning combination in the subsequent free spin, or the two free spins may only be awarded if a wining outcome is achieved in the subsequent free spin.

In different embodiments, the player's selection of a particular bonus enhancement may or may not be dependent on the outcome achieved in a subsequent spin. For example, in one embodiment the player's selection of pig 121*d* that reveals "2 Free Spins" and of pig 121*e* that reveals a "Barn Bonus" are each awarded regardless of whether a winning a combination in the subsequent free spin. Alternatively, the player's selection of pig 121*b*, revealing the "X2" multiplier, of pig 121*a*, revealing the "Wild" bonus, and of pig 121*d*, revealing the "Scatter" bonus, are each awarded based on the outcome of the subsequent free spin.

Clearly, the player's excitement level has been increased because of the unexpected award of more free spins. This type of result produces a more entertaining experience than having a bonus enhancement selected prior to the first free spin and having that bonus enhancement applied to all the free spins. The player repeats the process described above for each one of the three original free spins, for each one of the two free spins awarded before the second free spins, and for any other free spins that the player may win during the remaining free spins.

Other variations to the above example can be implemented as recognized by one of ordinary skill in the art. For example, the player may be allowed to select more than one blind selection 121 before each free spin. Or, the blind selections 121 can reveal different bonus enhancements after each free spin. In a further alternative, the blind selections 121 can reveal two or more of the same bonus enhancements before a free spin.

The "scatter" bonus enhancement of FIG. 4 provides the player with the advantage of having an increased likelihood of selecting a winning combination. For example, when the player has selected the "scatter" bonus enhancement a determination of a winning combination during the subsequent free spin is made by taking in account one or more symbols in addition to the symbols located along a selected payline(s). Thus, in a "scatter" configuration, symbol combinations defining the game outcomes are not required to be aligned with fixed payline(s). Rather, the symbol group is determined to include a basic winning combination if any combination of three symbols consisting of one symbol from each of the displayed reels corresponds to one of the symbol combinations identified in the pay table. For example, in a three-reel slot machine suppose that the symbol combination SYMBOL1, SYMBOL2, SYMBOL3 is a basic winning combination of a game played on the gaming terminal 10. If the "scatter" bonus enhancement is selected, the winning combination occurs if a first reel displays SYMBOL1 in either of the upper, center, or lower display positions, a second reel displays SYMBOL2 in either of the upper, center, or lower display positions (which need not correspond to the display position of SYMBOL1 on the first reel) and the third reel displays SYMBOL3 in either of the upper, center, or lower display positions (which need not correspond to the display positions of SYMBOL1 or SYMBOL2 on the first and second reels).

The "Wild" bonus enhancement 121*a* can be used to increase the likelihood that the player will achieve a winning combination during a subsequent free spin. In general, a wild symbol is a symbol that is different from and that can be used to replace any of the symbols required for a winning combination. In the embodiment depicted by FIGS. 3 and 4, the wild symbol is the "Wild" symbol. However, the wild symbol can be a randomly generated or a predetermined symbol, such as any of the symbols shown in FIG. 3. For example, the wild symbol can be the "Farmer" symbol, the "Tractor" symbol, the "Corn" symbol, etc.

Figure 5:
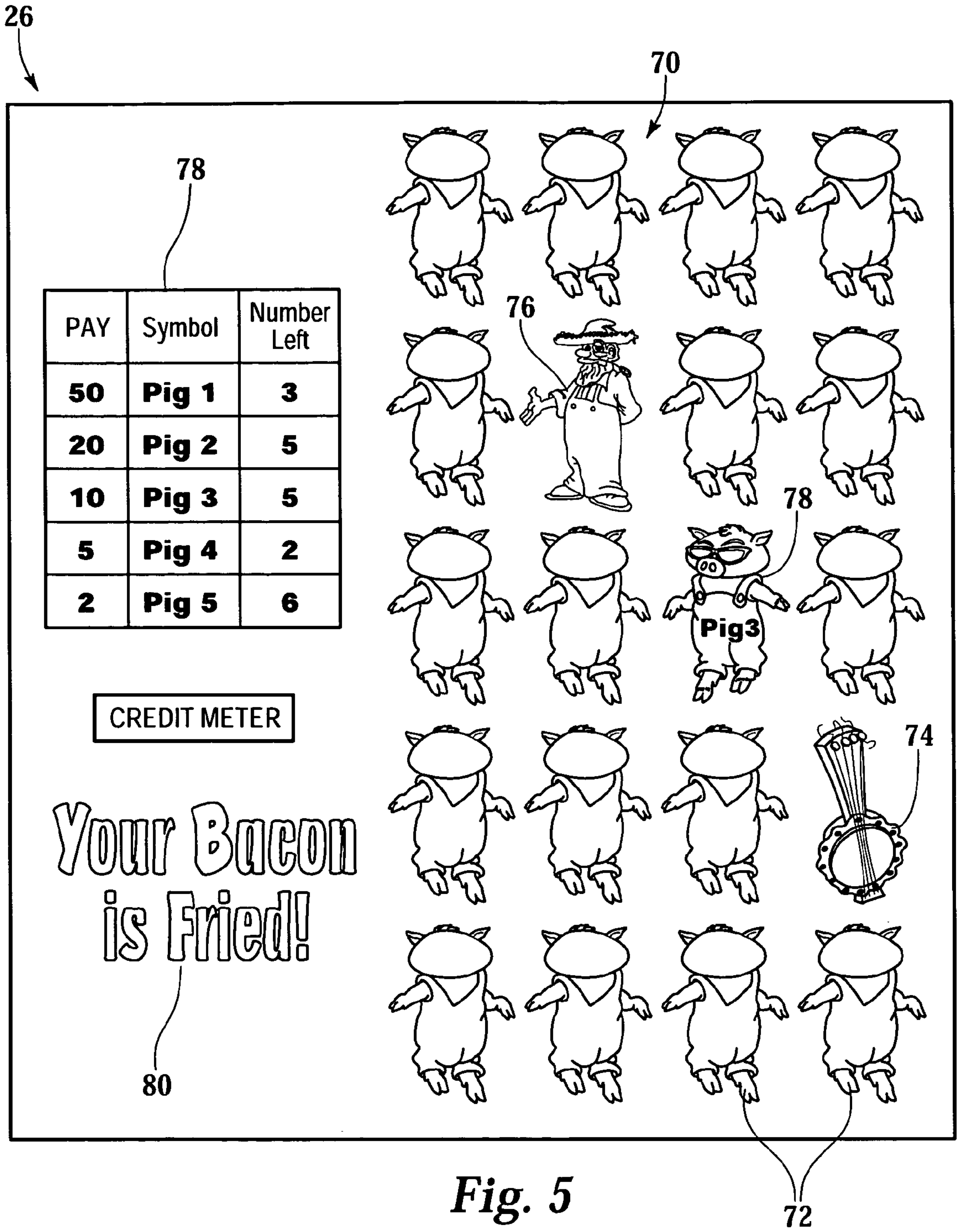
FIG. 5 illustrates a second-bonus game screen.

The "Barn Bonus" of FIG. 4 is another type of enhancement that requires further player selections to determine how the subsequent free spin will be affected. FIG. 5 illustrates a second bonus game requiring further player selections if the "Barn Bonus" is revealed in FIG. 4. The CPU 30 causes one of the displays to depict another screen which is different from the first screen showing the basic game and the second screen showing the bonus game. A transitional sequence (not shown) is triggered during which the reels 60 disappear and a barn appears. Music start playing through the speakers 23 and a camera shot zooms up close to the barn and in through a barn door. After the camera shot enters the barn door, a third screen showing the second bonus, as depicted FIG. 5, is displayed.

The second bonus screen displays approximately twenty pigs 72 in a second bonus game area 70, the pigs 72 being shown with their backs to the player. The pigs 72 are dancing and their tails are wagging profusely. Next to the second bonus game area 70 is a pay table 78 showing the number of pigs in the grid and what each pig pays. Five pigs have an associated pay amount, while the other fifteen pigs, although not having an associated pay amount, provide different outcomes to the game. A messaging area 80 provides visual and/or audio output to the player.

The player is prompted to select a pig 72. After the pig 72 is selected, the pig 72 turns around and reveals a second bonus enhancement. If the player selects pig 78, which has a vest with writing on it saying "Pig 3," then the player receives the corresponding award for pig 3 from the pay table 78. Thus, the player is awarded 10 credits. In the pay table 78, the player is also informed of how many selections the player may still make. Accordingly, after selecting pig 78, the player has five more selections left. In one embodiment the player collects the 10 credits only if a winning outcome is selected during the subsequent free spin. In another embodiment, the player collects the 10 credits regardless of whether a winning outcome is selected during the subsequent free spin.

Another second bonus enhancement is symbolized by a musical instrument, such as a guitar or a banjo. If the player selects pig 74, the pig turns around and reveals a guitar. Each time a musical instrument is revealed the music gets faster and all the values in the pay table 78 are increased for the remaining picks. The music gets faster and the pigs dance faster and faster the more musical instruments that are picked.

The second bonus ends when either the number of picks is reduced to zero, or, alternatively, when a special symbol is selected. For example, the second bonus ends when the player selects the pig 76 that reveals a farmer. The farmer can say and/or do something funny and then the player will be returned to the free spins screen that is shown in FIG. 3. For example, the farmer can laughingly shout "Your Bacon Is Fried!" to the player, while grinning and waving good bye.

Optionally the payout during the free spins can be preset to a specific value, such as at X1, which is the payout provided for a winning combination in the pay table during the basic game, X2, which is twice the payout provided for a winning combination in the pay table during the basic game, etc. Another option allows the player to retrigger the free spins, which resets the number of the free spins back to the original allowed free spins. For example, at the start of a bonus game the player receives ten free spins. After playing three of the ten free spins, the player has only seven free spins left. However, if the player selects a special symbol then the number of the free spins is retriggered back to the original number of free spins, i.e., ten.

Other variations to the above example can be implemented as recognized by one of ordinary skill in the art. For example, the player may be allowed to select more than one blind selection 121 before each free spin. Or, the blind selections 121 can reveal different bonus enhancements after each free spin. In a further alternative, the blind selections 121 can reveal two or more of the same bonus enhancements before a free spin.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming terminal for playing a wagering game, comprising:

a wager input device for receiving a wager input;

a basic game having a plurality of symbols that indicate a randomly selected outcome from a plurality of outcomes of the basic game, the randomly selected outcome being selected in response to the wager input by a player; and a bonus game being triggered by a predetermined event, the bonus game including a plurality of free spins and a plurality of blind selections, at least one of the blind selections being selected by the player independent of any symbol occurrence during any of the free spins and before playing each of the free spins, the selected one of the blind selections revealing a bonus enhancement applicable only to a subsequent free spin of the plurality of free spins, the bonus enhancement being provided to the player and being capable of enhancing an outcome of the subsequent free spin, the at least one of the blind selections being the bonus enhancement being concealed from the player prior to the player selecting the selected one of the blind selections and being revealed in response to the player selecting the selected one of the blind selections.

2. The gaming terminal of claim 1, wherein the bonus enhancement is provided to the player only if a winning combination is achieved during the subsequent free spin.

3. The gaming terminal of claim 1, wherein the bonus enhancement includes at least two different types of bonus enhancements.

4. The gaming terminal of claim 3, wherein the types of bonus enhancements are selected from a group consisting of a bonus multiplier, a wild for replacing any symbol required for a winning combination, a pay scatter for including symbols that are not aligned with a fixed payline, a credit award, an additional amount of free spins, and a second bonus game.

5. The gaming terminal of claim 1, wherein the plurality of blind selections and the plurality of symbols are depicted simultaneously on a video display.

6. The gaming terminal of claim 1, wherein the plurality of blind selections are exactly five blind selections.

7. The gaming terminal of claim 1, wherein each one of the plurality of blind selections is masked using a symbol associated with a theme of the wagering game.

8. The gaming terminal of claim 1, further comprising a display having a first screen and a second screen, the basic game being displayed on the first screen and the bonus game being displayed on the second screen.

9. The gaming terminal of claim 8, wherein the display is selected from a group consisting of a video display and a mechanical display.

10. The gaming terminal of claim 1, further comprising a first display and a second display, the basic game being displayed on the first display, the bonus game being displayed on the second display.

11. The gaming terminal of claim 10, wherein each of the first display and second display is selected from a group consisting of a video display and a mechanical display.

12. The gaming terminal of claim 1, wherein the at least one of the blind selections is selected via a touch screen.

13. A method for playing a wagering game, comprising:

(a) displaying a plurality of symbols for playing a basic game;

(b) indicating, via the symbols, a randomly selected outcome from a plurality of outcomes of the basic game;

(c) displaying a bonus game when the randomly selected outcome is a predetermined outcome, the bonus game including a plurality of free spins and a plurality of blind selections;

(d) selecting at least one of the blind selections before playing a subsequent free spin of the free spins, the at least one of the blind selections being selectable independent of the subsequent free spin and independent of any symbol occurrence during any of the free spins;

(e) revealing a bonus enhancement associated with the at least one of the blind selections after the selecting step;

(f) playing the subsequent free spin;

(g) applying the said bonus enhancement only to the subsequent free spin, the bonus enhancement being applied if a winning combination is achieved during the subsequent free spin; and (h) repeating the steps (d) through (g) for any remaining subsequent free spins of the plurality of free spins.

14. The method of claim 13, wherein the bonus enhancements include more than one category of bonus enhancements.

15. The method of claim 14, wherein the categories of bonus enhancements are selected from a group consisting of a bonus multiplier category, a wild symbol category for replacing a symbol required for a winning combination, a pay scatter category for including symbols that are not aligned with a fixed payline, a credit award category, an additional amount of free spins category, and a second bonus game category.

16. The method of claim 13, further comprising masking each one of the plurality of blind selections using a symbol associated with a theme of the wagering game.

17. The method of claim 13, wherein the displaying of the plurality of symbols for playing the said basic game is on a first screen and the displaying of the bonus game is on a second screen.

18. The method of claim 13, wherein two or more of the blind selections are selected in the selecting of the at least one of the blind selections before playing the subsequent free spin of the free spins.

19. The method of claim 13, wherein the bonus enhancement revealed in step (e) is different than one or more of bonus enhancements revealed in step (h).

20. The method of claim 13, wherein step (e) includes revealing at least two identical bonus enhancements.

21. The method of claim 13, wherein the selecting in step (d) is done using a touch screen.

22. A gaming terminal for playing a wagering game, comprising:

a wager input device for receiving a wager input;

at least one display for displaying a first screen and a second screen, the first screen showing a basic game having a number of reels, each of the reels having at least one symbol, the second screen showing a bonus game having a plurality of blind selections and a plurality of free spins; and a processor coupled to the display and operative to:

randomly select an outcome from a plurality of outcomes of the basic game in response to receiving a wager via the wager input device, cause the at least one display to display the second screen with the bonus game in response to a start-bonus outcome from the plurality of outcomes being achieved in the basic game, at least one of the plurality of blind selections being selected before each one of the plurality of free spins is activated independent of any symbol occurrence during any of the free spins, reveal a bonus enhancement associated with the selected one of the plurality of blind selections, the bonus enhancement being capable of enhancing an outcome of a subsequent free spin of the plurality of free spins, the bonus enhancement being concealed from a player prior to the player selecting the selected one of the blind selections and being revealed in response to the player selecting the selected one of the blind selections, and apply the bonus enhancement to a subsequent free spin if a winning combination is achieved during the subsequent free spin.

23. The gaming terminal of claim 22, wherein the bonus enhancement includes at least two different categories of bonus enhancements.

24. The gaming terminal of claim 23, wherein the categories of bonus enhancements are selected from a group consisting of a bonus multiplier category, a wild symbol category for replacing a symbol required for a winning combination, a pay scatter category for including symbols that are not aligned with a fixed payline, a credit award category, an additional amount of free spins category, and a second bonus category.

25. A method for playing a wagering game, comprising:

(a) displaying a plurality of symbols for playing a basic game;

(b) indicating, via the symbols, a randomly selected outcome from a plurality of outcomes of the basic game;

(c) displaying a bonus game when the randomly selected outcome is a predetermined outcome, the bonus game awarding a player with a plurality of free spins, the bonus game displaying a plurality of blind selections so that the player can select at least one blind selection;

(d) selecting at least one of the plurality of blind selections before playing a subsequent free spin of the free spins, the at least one of the blind selections being selectable independent of the subsequent free spin and independent of any symbol occurrence during any of the free spins;

(e) revealing a bonus enhancement associated with the at least one of the blind selections after the selecting step;

(f) providing the bonus enhancement to the player; and (g) repeating the steps (d) through (f) for another subsequent free spin of the plurality of free spins before returning to the basic game.

26. The method of claim 25, wherein the providing step includes awarding the bonus enhancement to the player only if a previous free spin of the free spins achieved a winning combination.

27. The method of claim 25, wherein the providing step includes awarding the bonus enhancement to the player only if a predetermined condition is fulfilled.

28. The method of claim 25, wherein the selecting step is required for only two of the free spins.

29. The method of claim 25, wherein the bonus enhancements include more than one category of bonus enhancements.

30. The method of claim 25, wherein the categories of bonus enhancements are selected from a group consisting of a bonus multiplier category, a wild symbol category for replacing a symbol required for a winning combination, a pay scatter category for including symbols that are not aligned with a fixed payline, a credit award category, an additional amount of free spins category, and a second bonus game category.

* * * * *